United States Patent [19]
Kashiwagi et al.

[11] Patent Number: 5,522,482
[45] Date of Patent: Jun. 4, 1996

[54] SUSPENSION CONTROL SYSTEM

[75] Inventors: Akira Kashiwagi, Kanagawa-ken; Takao Kohara, Tokyo, both of Japan

[73] Assignee: Tokico, Ltd., Kanagawa-ken, Japan

[21] Appl. No.: 205,102

[22] Filed: Mar. 3, 1994

[30] Foreign Application Priority Data

Mar. 12, 1993 [JP] Japan .................................. 5-079092
Dec. 28, 1993 [JP] Japan .................................. 5-353205

[51] Int. Cl.⁶ .................................................. F16F 9/46
[52] U.S. Cl. ........................... 188/299; 188/319; 280/707
[58] Field of Search .................................. 188/299, 319, 188/282, 285; 92/116; 280/707, 6.1; 267/136

[56] References Cited

U.S. PATENT DOCUMENTS

| | | | |
|---|---|---|---|
| 4,936,425 | 6/1990 | Boone | 188/299 |
| 5,242,190 | 9/1993 | Morris | 280/707 |
| 5,310,027 | 5/1994 | Nakamura | 188/299 |
| 5,324,066 | 6/1994 | Masumura | 188/299 |
| 5,324,067 | 6/1994 | Kallenbach | 188/299 |
| 5,384,706 | 1/1995 | Uchiyama | 280/707 |

FOREIGN PATENT DOCUMENTS

| | | |
|---|---|---|
| 4139711 | 6/1992 | Germany . |
| 4226050 | 2/1993 | Germany . |
| 4326227 | 2/1994 | Germany . |

*Primary Examiner*—Robert J. Oberleitner
*Assistant Examiner*—C. T. Bartz

[57] ABSTRACT

A suspension control system has a relative displacement sensor for detecting a relative velocity between a vehicle body and a wheel, and a controller which sets a relatively large value as a damping coefficient for the extension stroke of a hydraulic shock absorber, which is provided between the vehicle body and the wheel, when the magnitude of the relative velocity in the direction of the extension stroke exceeds a preset reference value, with priority to control based on the absolute velocity of the vehicle body. When the magnitude of the relative velocity between the vehicle body and the wheel in the direction of the extension stroke exceeds the reference value during running of the vehicle, for example, due to falling of the wheel into a depression, the damping coefficient for the extension stroke is set at a relatively large value with priority to the control based on the absolute velocity. Accordingly, when the wheel falls into a depression, occurrence of full bounce is prevented. Thus, the ride quality is improved.

4 Claims, 13 Drawing Sheets

SUSPENSION CONTROL SYSTEM

BACKGROUND OF THE INVENTION

1. Field of the Invention

The present invention relates to a suspension control system used for an automobile.

2. Description of the Background Art

One type of suspension control system that uses a damping force inversion shock absorber has already been known.

In such a suspension control system, when the direction of the absolute velocity of the vehicle body is upward, the damping force is controlled so that the damping characteristics for the extension stroke are "hard", whereas those for the retraction stroke are "soft". On the other hand, when the direction of the absolute velocity is downward, the control system effects control such that the extension damping characteristics are "soft", whereas the retraction damping characteristics are "hard".

With the conventional control system, when a wheel of the vehicle falls into a depression, since the direction of the absolute velocity of the vehicle body is downward, the damping characteristics for the extension stroke become "soft". Accordingly, before the wheel reaches the road surface, the shock absorber is brought into a full-bounce (full-extended) state, causing the ride quality to be degraded. When the wheel of the vehicle runs onto a projection, since the direction of the absolute velocity of the vehicle body is upward, the damping characteristics for the retraction stroke become "soft", so that the shock absorber is brought into a full-bump (full-retracted) state, causing the ride quality to be degraded.

SUMMARY OF THE INVENTION

Under the above-described circumstances, it is an object of the present invention to provide a suspension control system which enables an improvement in the ride quality.

The present invention may be applied to a suspension control system having a hydraulic shock absorber provided between a vehicle body and a wheel so that the damping coefficient for at least the extension stroke of the shock absorber can be controlled by driving an actuator, a device for detecting an absolute velocity of the vehicle body in a vertical direction, and a device for controlling the actuator such that when the direction of the absolute velocity detected by the absolute velocity detecting device is upward, the damping coefficient for the extension stroke increases depending on the magnitude of the absolute velocity, whereas, when the direction of the absolute velocity is downward, the damping coefficient for the extension stroke is set to a small value.

According to one aspect of the present invention, the suspension control system has a device for detecting a relative velocity between the vehicle body and the wheel, and the device for controlling the actuator effects a control operation in which, when the magnitude of the relative velocity in the direction of the extension stroke detected by the relative velocity detecting device exceeds a preset reference value, the damping coefficient for the extension stroke is set at a relatively large value, with priority to the control based on the absolute velocity, thereby preventing full bounce which might otherwise occurs when the wheel falls into a depression, and thus improving the ride quality.

According to another aspect of the present invention, the suspension control system has a device for detecting vertical acceleration acting on the vehicle body, and the control device for effects a control operation in which, when the magnitude of downward acceleration detected by the vertical acceleration detecting device exceeds a preset reference value, the damping coefficient for the extension stroke is set at a relatively large value, with priority to the control based on the absolute velocity.

In addition, the present invention may be applied to a suspension control system having a hydraulic shock absorber provided between a vehicle body and a wheel so that the damping coefficient for at least the retraction stroke of the shock absorber can be controlled by driving an actuator, a device for detecting an absolute velocity of the vehicle body in a vertical direction, and a device for controlling the actuator such that when the direction of the absolute velocity detected by the absolute velocity detecting device is downward, the damping coefficient for the retraction stroke increases depending on the magnitude of the absolute velocity, whereas, when the direction of the absolute velocity is upward, the damping coefficient for the retraction stroke is set to a small value.

According to another aspect of the present invention, the suspension control system has a device for detecting a relative velocity between the vehicle body and the wheel, and the device for controlling the actuator effects a control operation in which, when the magnitude of the relative velocity in the direction of the retraction stroke detected by the relative velocity detecting device exceeds a preset reference value, the damping coefficient for the retraction stroke is set at a relatively large value, with priority to the control based on the absolute velocity, thereby preventing full bump which might otherwise occur when the wheel runs onto a projection, and thus improving the ride quality.

According to another aspect of the present invention, the suspension control system has a device for detecting vertical acceleration acting on the vehicle body, and the device effects a control operation in which, when the magnitude of upward acceleration detected by the vertical acceleration detecting device exceeds a preset reference value, the damping coefficient for the retraction stroke is set at a relatively large value, with priority to the control based on the absolute velocity.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS

Prior to the description of embodiments of the present invention, a conventional suspension control system will be explained with reference to FIGS. 11 and 12 for the purpose of facilitating the understanding of the present invention.

Figure 11:
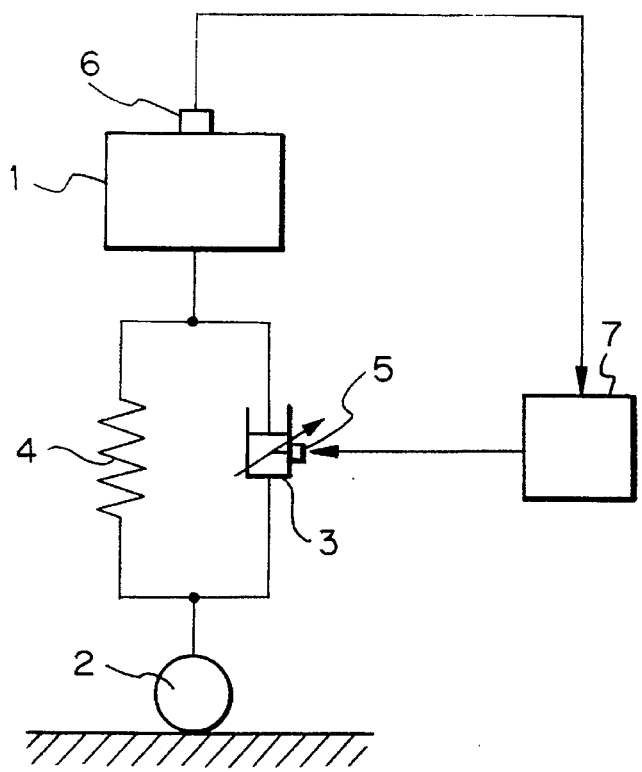
FIG. 11 schematically shows one example of a conventional suspension control system.

FIG. 11 shows one example of conventional suspension control systems. With reference to the figure, a combination of a damping coefficient inversion shock absorber 3 and a spring 4 is interposed between a vehicle body 1 and each of four wheels 2 (only one of them is shown in the figure) to suspend the vehicle body 1. It should be noted that, although a total of four combinations of shock absorbers 3 and springs 4 are provided to correspond to the four wheels 2, only one combination is shown in the figure for the sake of convenience.

The damping coefficient inversion shock absorber 3 is arranged so that the damping coefficients for the extension and retraction strokes can be controlled in accordance with the position of a passage area control member (not shown) which is driven by an actuator 5. More specifically, as shown in FIG. 12, when the passage area control member is moved in one direction to set damping characteristics, the damping coefficient for the extension stroke assumes a relatively small, constant value ("soft") in a predetermined region, and it increases in proportion to the movement of the control member in a region (hereinafter referred to as "extension 'hard' region") beyond the predetermined region (hereinafter referred to as "extension 'soft' region"). On the other hand, the damping coefficient for the retraction stroke decreases in a "hard" state in proportion to the movement of the control member and assumes a relatively small, constant value ("soft") in the extension "hard" region.

A vertical acceleration sensor 6 is provided on the vehicle body 1 to detect vertical acceleration acting on the vehicle body 1.

A controller 7 is provided in connection with the vertical acceleration sensor 6 and the actuator 5. The controller 7 executes the following arithmetic processing and controls the actuator 5, and hence the passage area control member, on the basis of the result of the arithmetic processing. The contents of the arithmetic processing executed by the controller 7 will be explained below.

First, initialization is executed. Next, the controller 7 inputs a sensor value and executes absolute velocity (vertical) calculating processing on the basis of the sensor value. Subsequently, the controller 7 judges whether the direction of the absolute velocity is upward or downward. When the direction of the absolute velocity is downward, the controller 7 sets the passage area control member in the above predetermined region, that is, a region where the damping coefficient for the extension stroke assumes a relatively small, constant value so that the suspension characteristics are "soft" during the extension stroke.

When the direction of the absolute velocity is upward, the controller 7 sets the passage area control member in a region beyond the predetermined region, that is, a region where the damping coefficient for the retraction stroke assumes a relatively small, constant value so that the suspension characteristics are "soft" during the retraction stroke.

Figure 13:
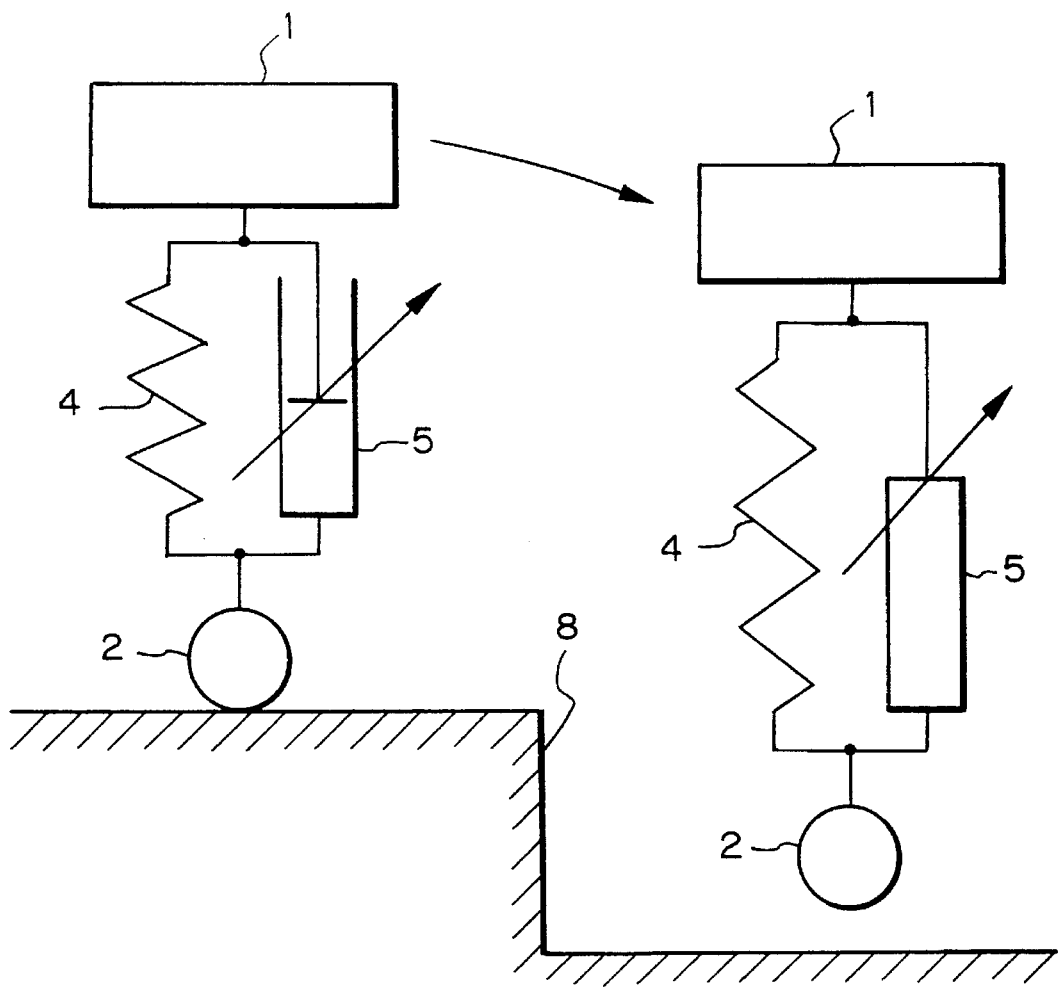
FIG. 13 shows the way in which the conventional suspension control system operates when a vehicle equipped with it passes over a relatively large step and moves downward with a wheel falling into a depression.

Incidentally, with the above-described conventional suspension control system, when the vehicle passes over a relatively large step 8 on a road and moves downward with the wheel 2 falling into a depression, as shown in FIG. 13, the direction of the absolute velocity of the vehicle body 1 is downward. Therefore, the passage area control member is set in the extension "soft" region. Accordingly, the damping force for the extension stroke becomes "soft", so that before the wheel 2 reaches the road surface, the shock absorber may be brought into a full-bounce (full-extended) state by the restoring force of the spring 4. In such a case, an impact caused when the wheel 2 reaches the road surface may be transmitted to the vehicle body 1, thus degrading the ride quality.

When the wheel 2 runs onto a projection, the direction of the absolute velocity of the vehicle body 1 is upward. Accordingly, the passage area control member is set in the extension "hard" region. Consequently, the damping force for the retraction stroke become "soft". Therefore, when the wheel 2 runs onto a relatively large projection, the shock absorber may be brought into a full-bump (full-contracted) state against the spring 4, causing the ride quality to be degraded.

A first embodiment of the suspension control system according to the present invention will be described below with reference to FIGS. 1 to 5. It should be noted that the same members and portions as those shown in FIG. 11 are denoted by the same reference numerals, and a description thereof is omitted.

Figure 1:
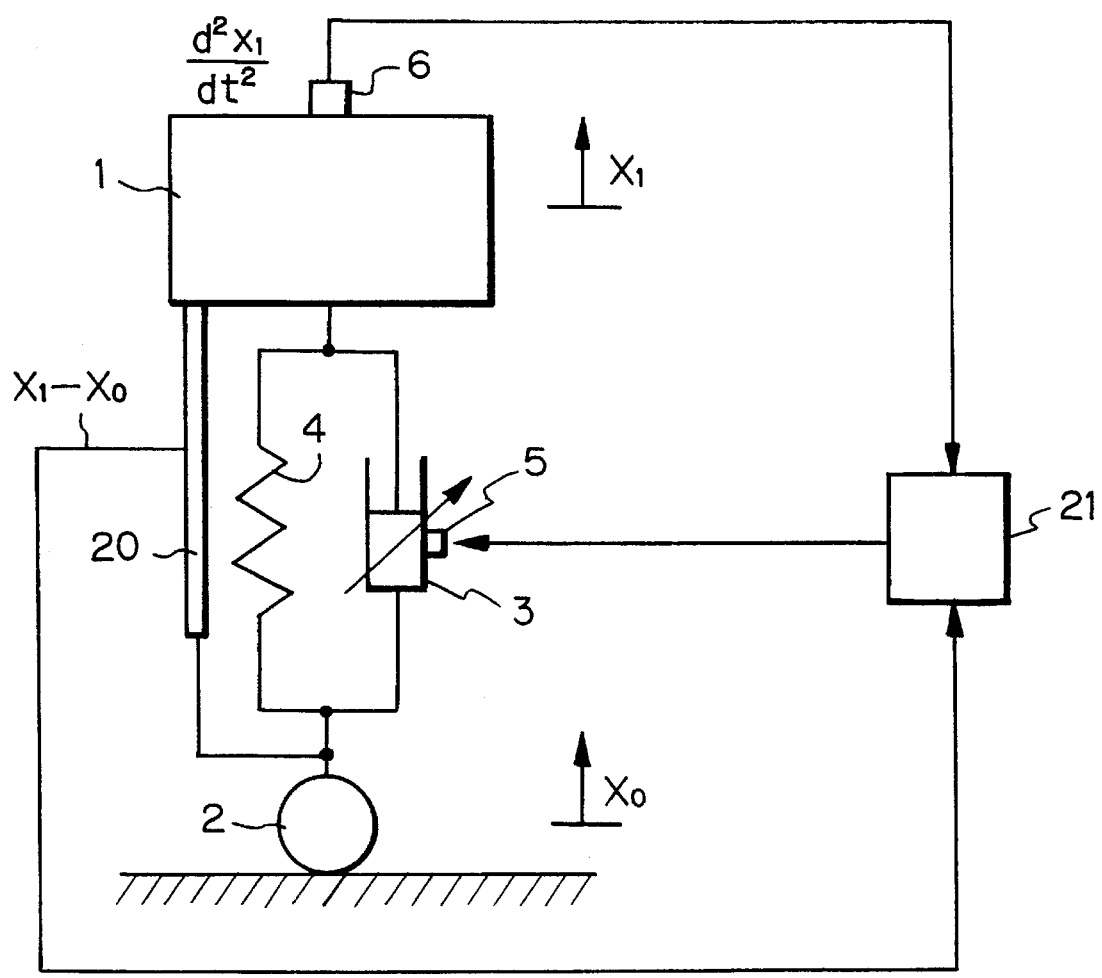
FIG. 1 schematically shows a first embodiment of the suspension control system according to the present invention.

Referring to FIG. 1, a relative displacement sensor 20 detects a relative displacement between a vehicle body 1 and an unsprung mass (axle). A controller 21 is provided in connection with a vertical acceleration sensor 6, an actuator 5 and the relative displacement sensor 20.

Figure 3:
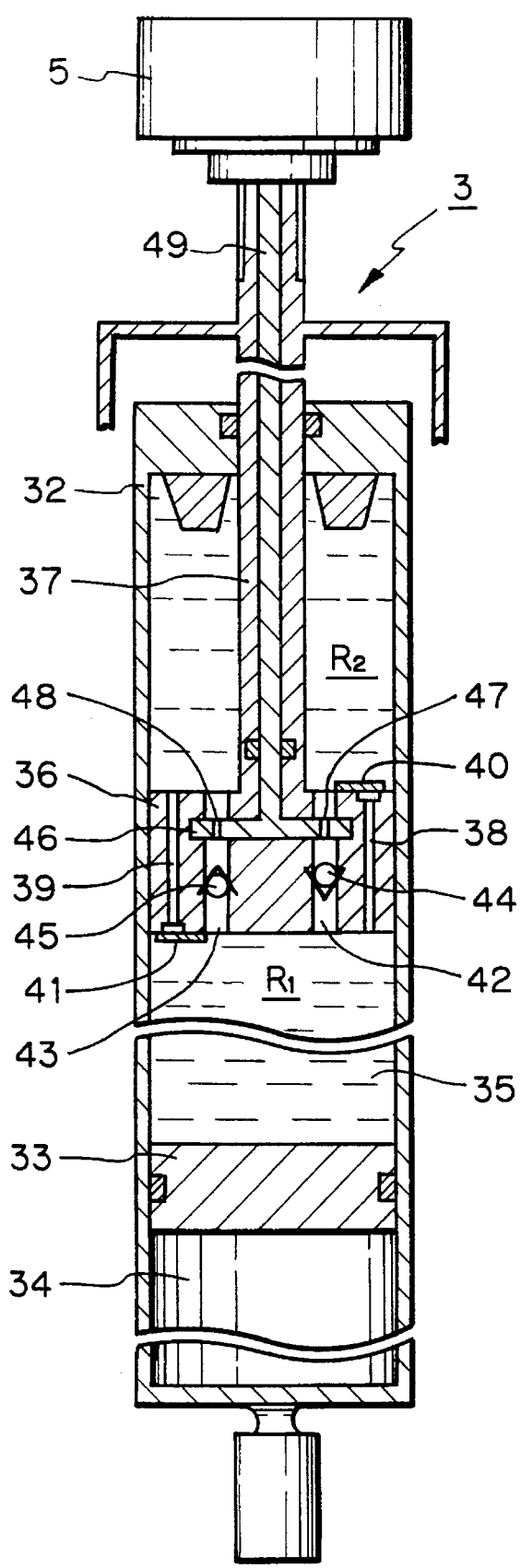
FIG. 3 is a sectional view of one example of a damping coefficient inversion shock absorber which may be employed in the first embodiment.

A hydraulic shock absorber 3, for example, a damping coefficient inversion shock absorber, is interposed between the vehicle body 1 and each wheel 2. The damping coefficient inversion shock absorber 3 will be explained below with reference to FIGS. 3 and 4. As shown in FIG. 3, a free piston 33 is slidably fitted in a cylinder 32 to divide the inside of the cylinder 32 into two chambers, a gas chamber 34 and a hydraulic fluid chamber 35. The gas chamber 34 has a high-pressure gas sealed therein, and the hydraulic fluid chamber 35 has a hydraulic fluid sealed therein.

A piston 36 is slidably fitted in the hydraulic fluid chamber 35 to divide it into a lower chamber $R_1$ and an upper chamber $R_2$. A piston rod 37 is connected to the piston 36. The piston rod 37 extends through the upper chamber $R_2$ and projects outside the cylinder 32.

The piston 36 is provided with first and second communicating passages 38 and 39 for providing communication between the lower and upper chambers $R_1$ and $R_2$. A first normally-closed damping valve 40 is attached to the upper end of the piston 36. The first damping valve 40 opens the first communicating passage 38 when the pressure difference between the lower and upper chambers $R_1$ and $R_2$ reaches a predetermined value as a result of the rise of pressure in the lower chamber $R_1$ during the retraction stroke of the piston rod 37. Similarly, a second normally-closed second damping valve 41 is attached to the lower end of the piston 36. The second damping valve 41 opens the second communicating passage 39 when the pressure difference between the lower and upper chambers $R_1$ and $R_2$ reaches a predetermined value as a result of the rise of pressure in the upper chamber $R_2$ during the extension stroke of the piston rod 37.

The piston 36 is formed with third and fourth communicating passages 42 and 43 which face each other across the axis of the piston rod 37. The third and fourth communicating passages 42 and 43 each communicate with the upper and lower chambers $R_1$ and $R_2$. The third and fourth communicating passages 42 and 43 are provided with check valves 44 and 45, respectively. The check valve 44 allows the flow of hydraulic fluid only from the lower chamber $R_1$ toward the upper chamber $R_2$, whereas the check valve 45 allows the flow of hydraulic fluid only from the upper chamber $R_2$ toward the lower chamber $R_1$.

Figure 4:
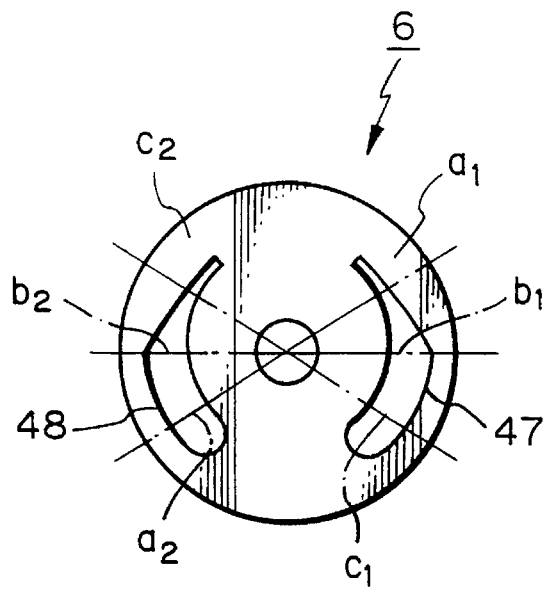
FIG. 4 is a plan view of a movable plate that constitutes a part of the damping coefficient inversion shock absorber shown in FIG. 3.

The piston 36 has a disk-shaped movable plate 46 retained therein such that the movable plate 46 is rotatable about the axis of the piston rod 37. The plane of the movable plate 46 crosses the third and fourth communicating passages 42 and 43. As shown in FIG. 4, the movable plate 46 is provided with a pair of concentric elongate holes 47 and 48 which face each other across the axis of the movable plate 46. The elongate holes 47 and 48 extend circumferentially of the movable plate 46. One elongate hole 47 has such a configuration that the width thereof gradually increases from one end thereof in the clockwise direction as viewed in FIG. 4 as far as a halfway position (denoted by $b_1$ in FIG. 4), and the width remains constant at the increased value from the position $b_1$ to the other end. The other elongate hole 48 has such a configuration that the width thereof remains constant at a relatively large value from one end thereof in the clockwise direction as viewed in FIG. 4 as far as a halfway position (denoted by $b_2$ in FIG. 4), and the width gradually decreases toward the other end from the position $b_2$. The movable plate 46 constitutes a passage area control member for controlling the passage areas of the third and fourth communicating passages 42 and 43. That is, in response to the rotation of the movable plate 46 about the axis thereof, the elongate holes 47 and 48 face the third and fourth communicating passages 42 and 43 at the selected positions thereof. Thus, the passage areas defined by the elongate holes 47 and 48 and the third and fourth communicating passages 42 and 43 can be continuously varied.

The controller 21 executes the following arithmetic processing and controls the devices connected thereto on the basis of the result of the arithmetic processing. The contents of the arithmetic processing executed by the controller 21 will be explained below.

Figure 2A:
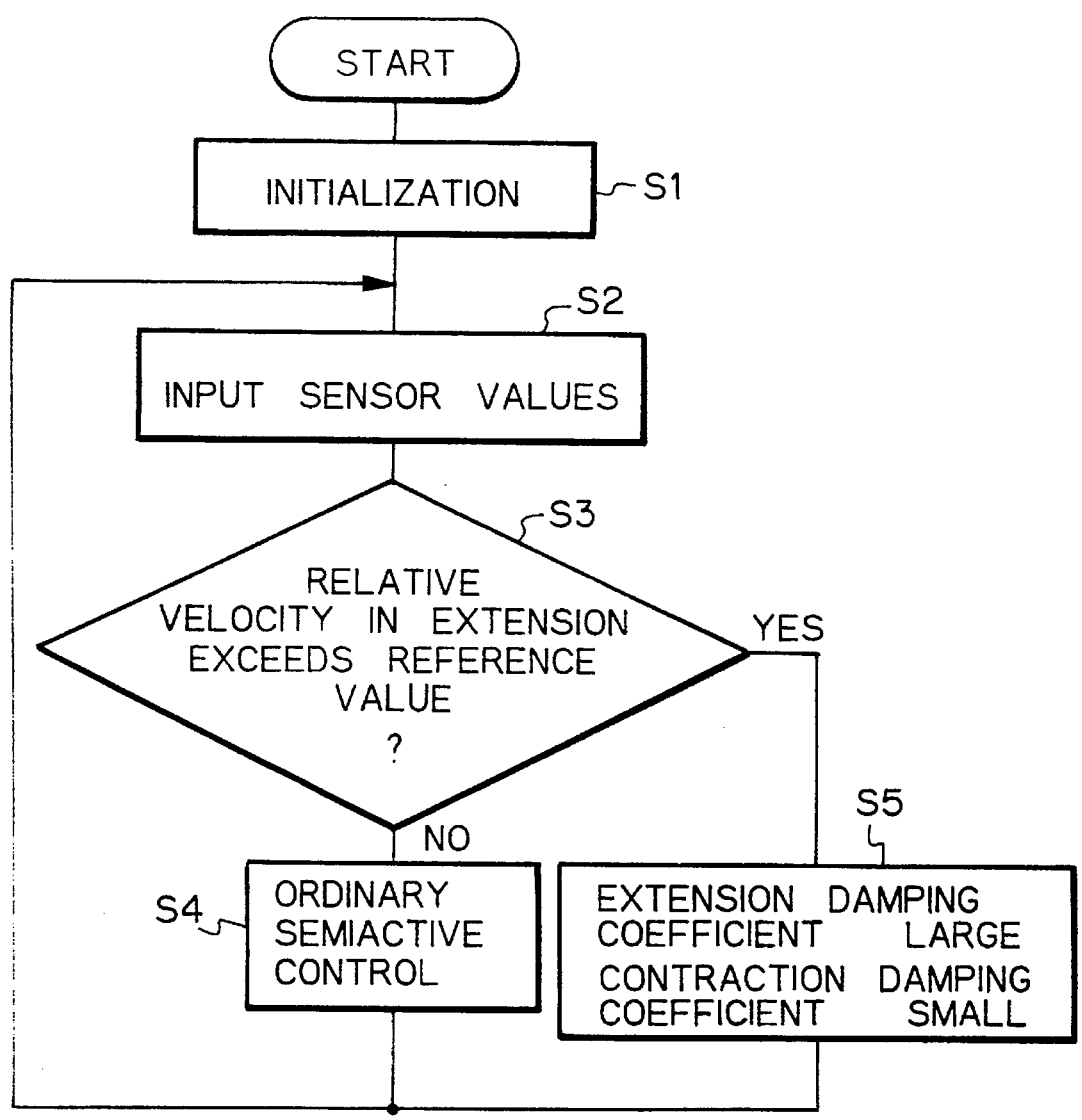
FIG. 2A is a flowchart showing the contents of control executed by a controller in the suspension control system of the first embodiment.

FIG. 2A shows a main program (main routine) executed by the controller 21. First, initialization is effected (Step S1). At Step S2, the controller 21 inputs sensor values from the vertical acceleration sensor 6 and the relative displacement sensor 20, and obtains a relative velocity $(dX_1/dt - dX_0/dt)$ between the vehicle body and the unsprung mass from the value of the relative displacement sensor 20.

At the subsequent Step S3, the controller 21 judges whether or not the magnitude of relative velocity $(dX_1/dt - dX_0/dt)$ between the vehicle body and the unsprung mass in the direction of extension exceeds a preset reference value $(L_1)$ [i.e., $(dX_1/dt - dX_0/dt) \geq L_1$]. If NO is the answer, the controller 21 effects ordinary semiactive control on the basis of the following basic control logic (Step S4).

The basic control logic will be explained below. The basic control logic is executed on the basis of Karnopp's control rule. First, Karnopp's control rule will be explained [see ASME, Journal of Engineering for Industry, No. 96-2. pp. 619–626 (May, 1974)]. Roughly speaking, Karnopp's control rule is designed to determine a level of damping force (and hence a damping coefficient) to be obtained in accordance with the sign of the product of the absolute velocity $(dX_1/dt)$ of the sprung mass (the vehicle body) and the relative velocity $(dX_1/dt - dX_0/dt)$ between the vehicle body and the unsprung mass. The concept of Karnopp's control rule may be expressed by $$IF (dX_1/dt)(dX_1/dt - dX_0/dt) > 0 \qquad (1)$$

$$F = -C_s(dX_1/dt) = -C(dX_1/dt - dX_0/dt) \qquad (2)$$

$$\text{Thus, } C = C_s(dX_1/dt)/(dX_1/dt - dX_0/dt) \qquad (3)$$

$$IF (dX_1/dt)(dX_1/dt - dX_0/dt) \qquad (4)$$

$$F = 0 \qquad (5)$$

$$\text{Thus, } C = 0 \qquad (6)$$

where $X_1$: displacement of the sprung mass (the vehicle body 1)

$X_0$: displacement of the unsprung mass (road surface)

F: damping force of the shock absorber $C_s$: damping coefficient of an imaginary shock absorber provided between the sprung mass and the absolute system of coordinates C: damping coefficient of the shock absorber provided between the sprung mass and unsprung mass With regard to the expression (3), $(dX_1/dt - dX_0/dt)$ may be regarded as an average, constant value to make an approximation as follows:

$$C = K_v \cdot dX_1/dt \qquad (7)$$

where K is a constant.

According to the basic control logic of this embodiment, a damping coefficient is obtained by using the expression (7) in place of the expression (3) of Karnopp's control rule. Although C=0 in the expression (6) of Karnopp's control rule, since there is a control delay for a change of vibration, the basic control logic of this embodiment defines C as follows:

$$C = C_{min} (\neq 0) \qquad (8)$$

That is, according to the basic control logic of this embodiment, when the condition of the expression (1) is met, a damping coefficient corresponding to expression (7) is set, whereas, when the condition of the expression (4) is met, a damping coefficient corresponding to the expression (8) is set.

Figure 12:
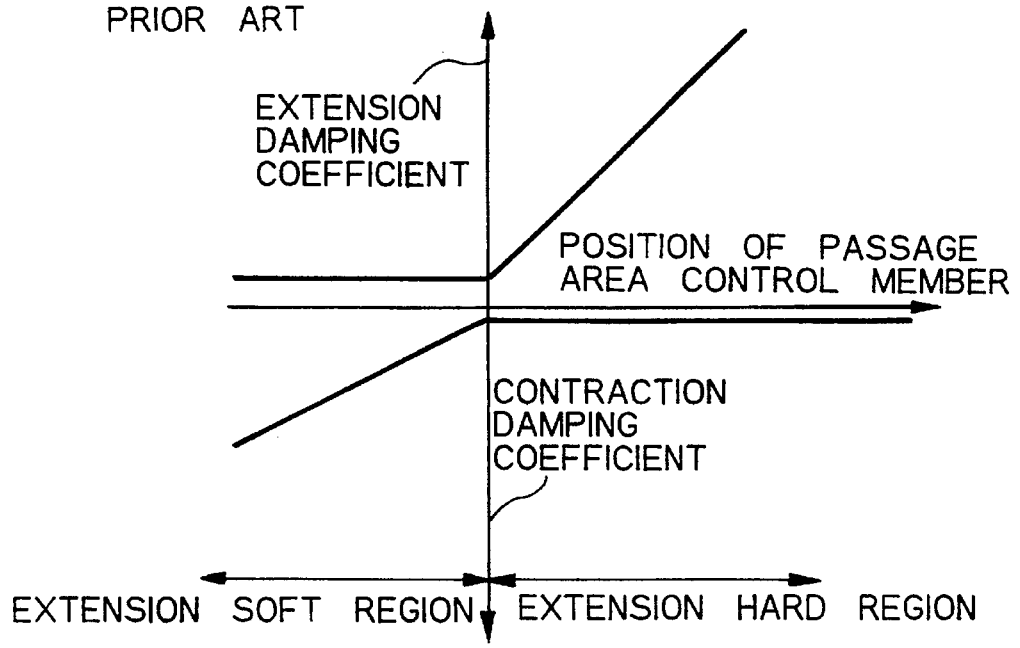
FIG. 12 is a graph showing damping force characteristics of a damping coefficient inversion shock absorber employed in the conventional suspension control system.

In a case where the damping coefficient inversion shock absorber 3, shown in FIGS. 3 and 4, is employed, suspension control may be effected as shown in FIG. 12. That is, when the direction of the absolute velocity of the vehicle body is upward ($dX_1/dt>0$), the position of the passage area control member is controlled according to this absolute velocity so that it stays in the extension "hard" region shown in FIG. 12. Consequently, the damping coefficient for the extension stroke coincides with the value of the expression (7), and the damping coefficient for the retraction stroke coincides with the value of the expression (8). When the direction of the absolute velocity of the vehicle body is downward ($dX_1/dt<0$), the position of the passage area control member is controlled according to this absolute velocity so that it stays in the extension "soft" region shown in FIG. 12. Consequently, the damping coefficient for the extension stroke coincides with the value of the expression (8), and the damping coefficient for the retraction stroke coincides with the value of the expression (7). Thus, in the process achieved by the basic control logic of this embodiment, semiactive control can be effected by using only the absolute velocity without using the relative velocity ($dX_1/dt-dX_0/dt$) between the vehicle body and the unsprung mass.

Figure 5:
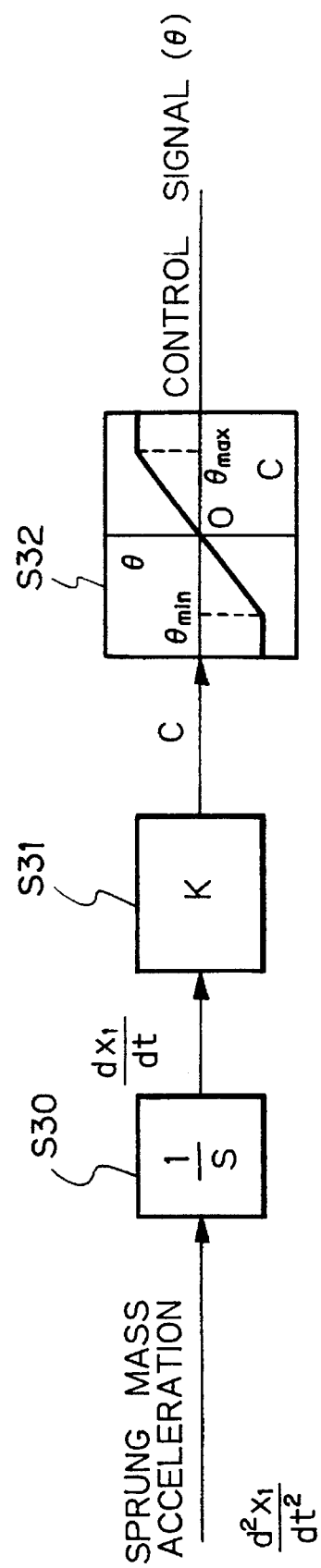
FIG. 5 schematically shows the contents of Step S4 shown in FIG. 2A.

Therefore, at Step S4, control such as that shown in FIG. 5 is executed. That is, a vertical acceleration signal from the vertical acceleration sensor 6 is integrated (Step S30) to obtain a vertical absolute velocity of the vehicle body. The absolute velocity is multiplied by a gain K (Step S31) to obtain a signal C, and a control signal θ for controlling the angle of rotation of the actuator 5 is obtained from the signal C and output to the actuator 5 (Step S32), thereby controlling the position of the passage area control member.

If YES is the answer at Step S3 in FIG. 2A, that is, if it is judged that the magnitude of relative velocity ($dX_1/dt-dX_0/dt$) between the vehicle body and the unsprung mass in the direction of extension exceeds the reference value, the processing at Step S5 is executed. That is, at Step S5, the controller 21 executes the following control in place of the control based on the absolute velocity, which is executed at Step S4: The controller 21 sets the passage area control member in a region beyond the above predetermined region, and outputs $θ_{max}$ as a control signal θ for the actuator 5 so that a relatively large value is obtained as a damping coefficient for the extension stroke, and a relatively small value is obtained as a damping coefficient for the retraction stroke.

With the suspension control system, arranged as described above, when the magnitude of relative velocity ($dX_1/dt-dX_0/dt$) between the vehicle body and the unsprung mass in the direction of extension exceeds the reference value during running of the vehicle because the wheel concerned fails into a depression, for example, as shown in FIG. 13, the damping coefficient for the extension stroke becomes relatively large. Accordingly, the suspension control system of this embodiment effectively functions without causing full bounce as occurs with the conventional suspension control system shown in FIG. 11 when the wheel falls into a depression. Thus, the ride quality can be improved.

Figure 2B:
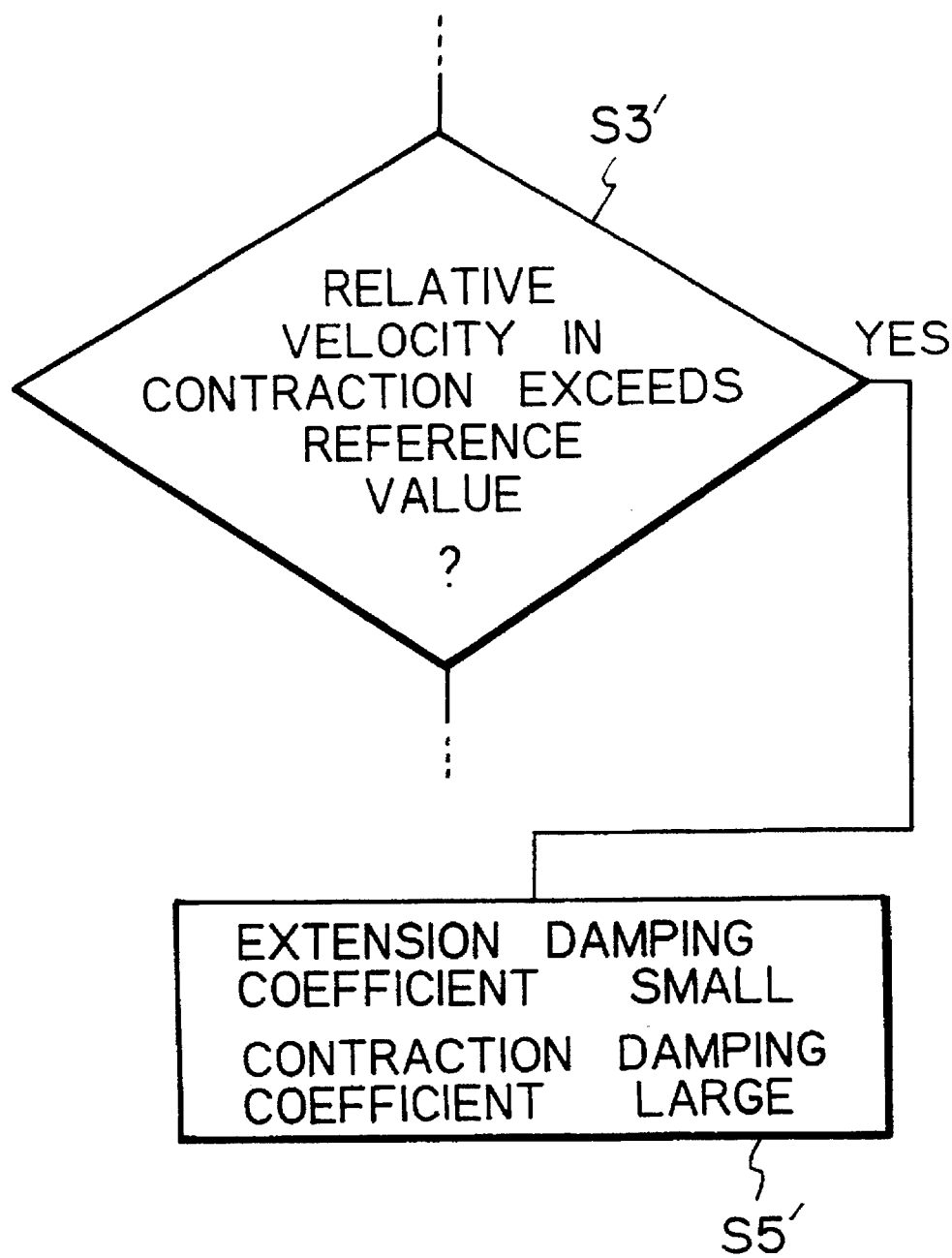
FIG. 2B is a flowchart showing a modification of the control process shown in FIG. 2A.

The embodiment shown in FIG. 2A may be modified so as to prevent full bump, which might otherwise occur when the wheel concerned runs onto a relatively large projection at high speed, by changing Steps S3 and S5 in FIG. 2A into Steps S3' and S5' shown in FIG. 2B. More specifically, Step S3 in FIG. 2A is replaced by Step S3' where it is judged whether or not the magnitude of relative velocity in the direction of retraction exceeds a preset reference value $|L_2|$ ($L_2$ is a negative value because the vertical absolute velocity assumes a positive value when the direction thereof is upward) [i.e., ($dX_1/dt-dX_0/dt$)≤$L_2$]. If YES is the answer, the process proceeds to Step S5' in place of Step S5 in FIG. 2, where $θ_{min}$ is output as an actuator control signal θ so that the damping coefficient for the extension stroke is relatively small, while the damping coefficient for the retraction stroke is relatively large. Thus, with priority to the above-described control based on the absolute velocity, the passage area control member is set in the extension "soft" region, so that a relatively large value can be obtained as a damping coefficient for the retraction stroke when the piston rod is retracted, for example, when the wheel concerned runs onto a projection. Accordingly, the suspension control system of this modification effectively functions without causing so-called full bump as occurs with the conventional suspension control system of the same type when the piston rod is retracted, for example, when the wheel runs onto a projection at high speed. Thus, the ride quality can be improved.

Although in the foregoing description of the first embodiment an example of preventing full bounce when the wheel falls into a depression and an example of preventing full bump when the wheel runs onto a projection have been explained independently of each other, it should be noted that the suspension control system may be arranged in conformity to the concept of each particular vehicle to which it is applied. That is, the suspension control system may be arranged to prevent either full bounce or full bump. Alternatively, the suspension control system may be arranged such that when the relative velocity exceeds a reference value, it is judged whether the direction of the relative velocity is the extension side or the retraction side, and Step S5 or S5' is selected according to the direction of the relative velocity, thereby preventing both full bounce and full bump.

Figure 6:
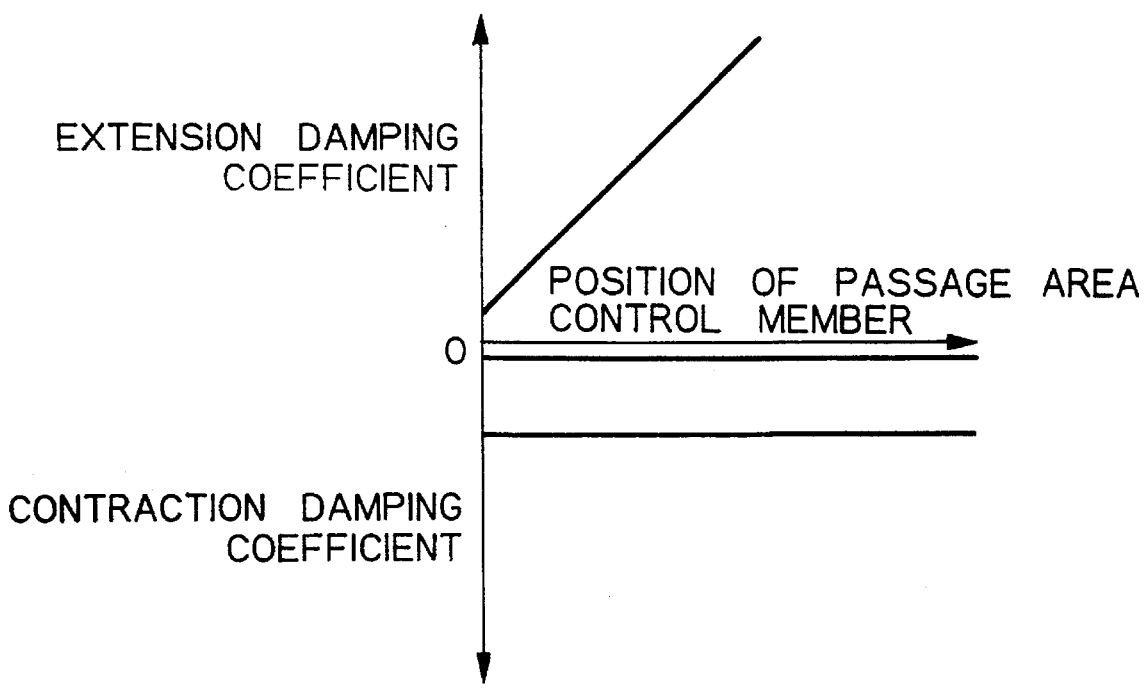
FIG. 6 is a graph showing the characteristics of another shock absorber which may be used in place of the damping coefficient inversion shock absorber shown in FIG. 3.

The following is a description of a modification of the first embodiment, in which the present invention is applied to a shock absorber having damping coefficient characteristics such as those shown in FIG. 6. This shock absorber is capable of controlling the damping coefficient for the extension stroke in accordance with the position of a passage area control member which is driven by the actuator 5. As shown in FIG. 6, the shock absorber has such characteristics that the damping coefficient for the extension stroke increases in proportion to the movement of the passage area control member in one direction, while the damping coefficient for the retraction stroke is constant irrespective of the movement of the passage area control member.

Figure 7:
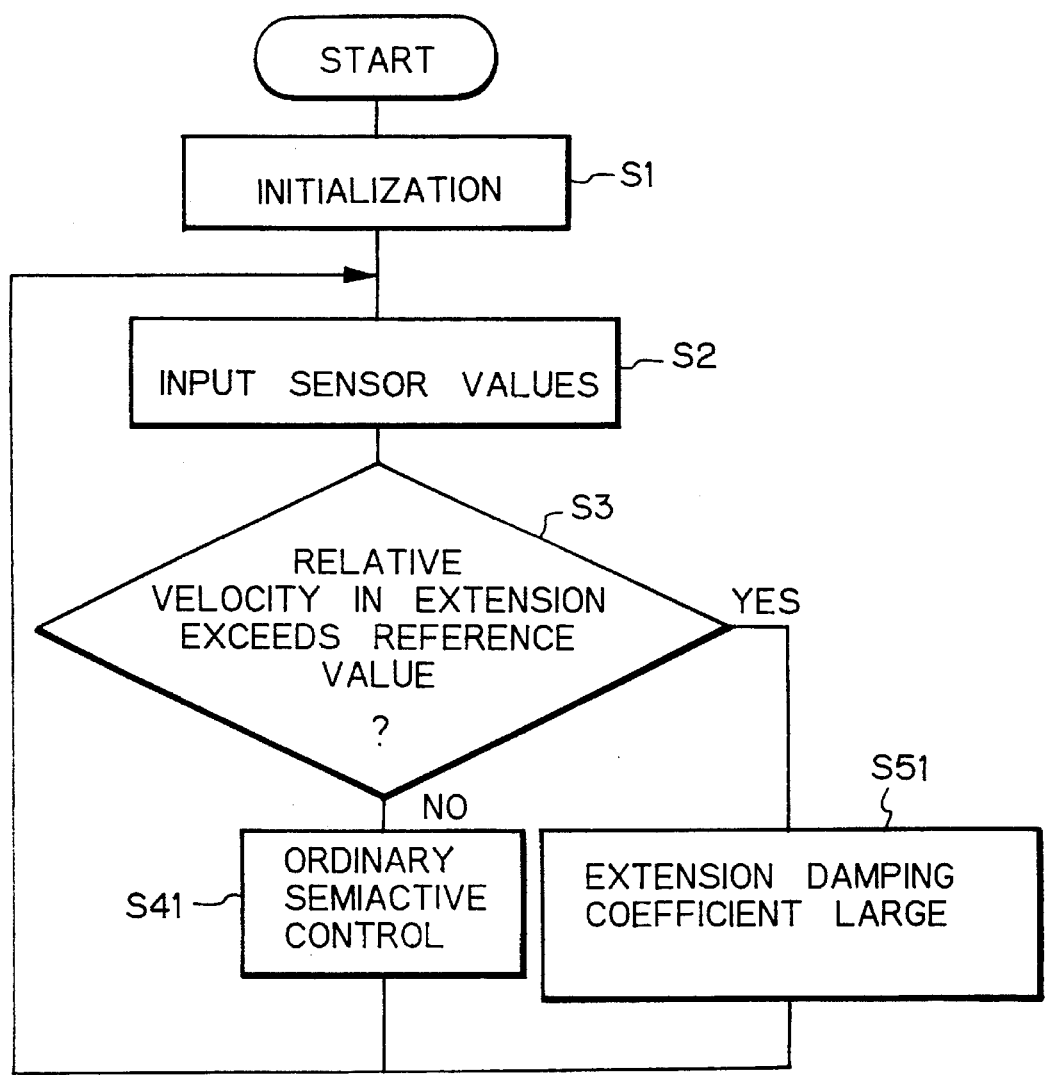
FIG. 7 is a flowchart showing the contents of control executed by a controller in the suspension control system of the present invention that employs a shock absorber having the characteristics shown in FIG. 6.
Figure 8:
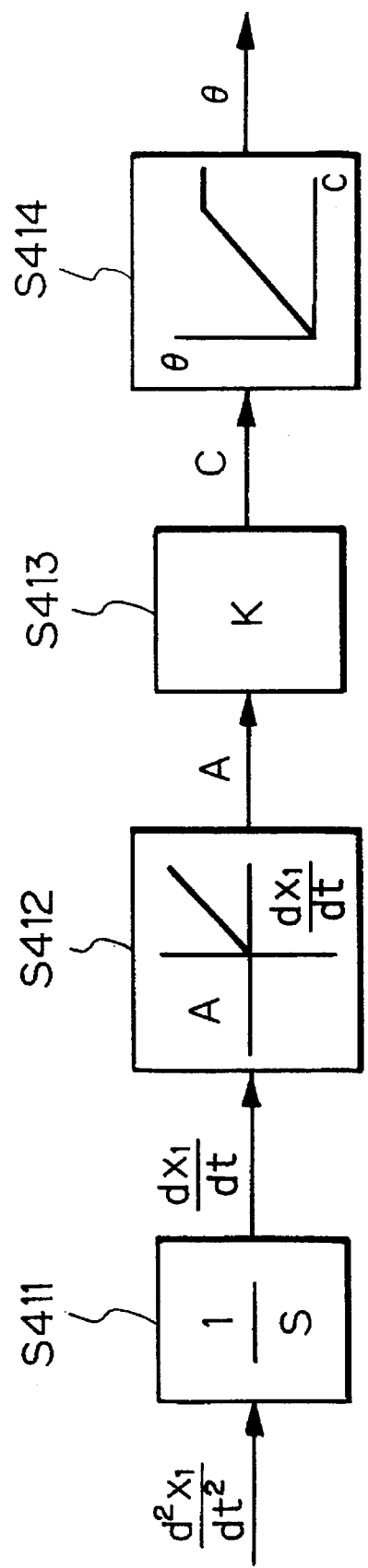
FIG. 8 schematically shows the contents of Step S41 shown in FIG. 7.

As shown in FIG. 7, the controller in this modification executes processing of Steps S1 to S3 similar to Steps S1 to S3 in FIG. 2A, which shows the first embodiment. If NO is the answer at Step S3, the process proceeds to Step S41 where ordinary semiactive control is executed. At Step S41, control such as that shown in FIG. 8 is executed. That is, a vertical acceleration signal from the vertical acceleration sensor 6 is integrated to obtain a vertical absolute velocity of the vehicle body (Step S411). Data which is proportional to the absolute velocity is obtained (Step S412), and the data is multiplied by a gain K (Step S413) to obtain a signal C. Then, a control signal Θ for controlling the angle of rotation of the actuator 5 is output to the actuator 5 (Step S414), thereby controlling the position of the passage area control member. If YES is the answer at Step S3, that is, if it is judged at Step S3 that the relative velocity ($dX_1/dt-dX_0/dt$) in the direction of extension exceeds the reference value, the process proceeds to Step S51 where $\theta_{max}$ is output as a control signal $\theta$ so that a relatively large value is obtained as a damping coefficient for the extension stroke.

With the suspension control system, arranged as described above, when the magnitude of relative velocity ($dX_1/dt - dX_0/dt$) between the vehicle body and the unsprung mass in the direction of extension exceeds the reference value during running of the vehicle because the wheel concerned falls into a depression., for example, as shown in FIG. 13, the damping coefficient for the extension stroke becomes relatively large. Accordingly, the suspension control system of this modification effectively functions without causing full bounce as occurs with the conventional suspension control system shown in FIG. 11 when the wheel falls into a depression. Thus, the ride quality can be improved.

Figure 9:
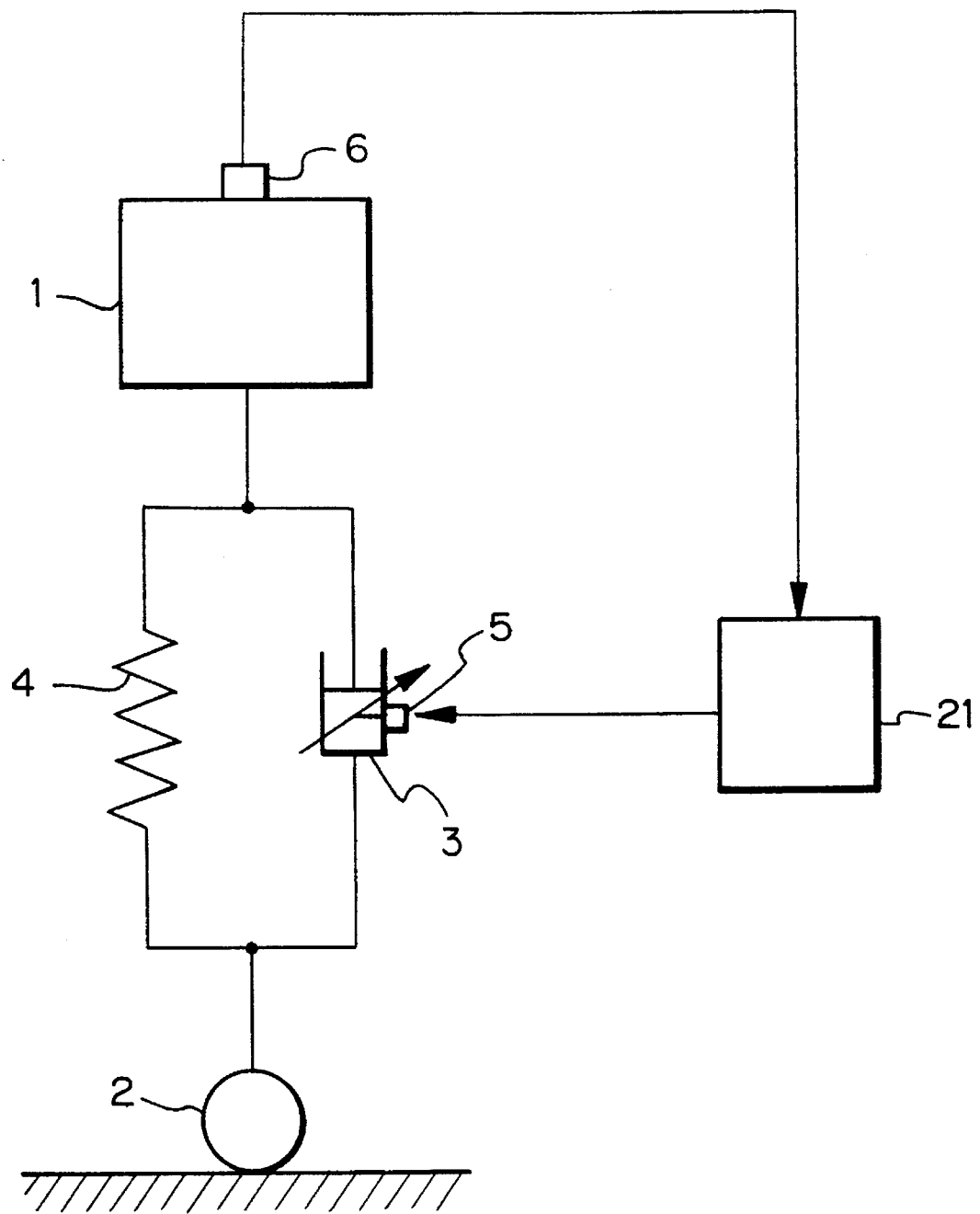
FIG. 9 schematically shows a second embodiment of the suspension control system according to the present invention.

A second embodiment of the present invention will be described below with reference to FIGS. 9 and 10A. The second embodiment differs from the first embodiment in that the relative displacement sensor 20 in the first embodiment is omitted, and that the contents of control executed by the controller 21 in the second embodiment are those shown in FIG. 10A, whereas the controller 21 in the first embodiment performs control as shown in FIG. 2. Since the other members and control contents are the same as those in the first embodiment, description thereof are omitted.

First, the controller 21 executes initialization and then inputs sensor values and calculates data from the sensor values (Steps S1 and S2) in the same way as at Steps S1 and S2 in the first embodiment.

At the subsequent Step S11, it is judged whether or not the value (absolute acceleration) of the vertical acceleration sensor 6 is downward and exceeds a preset reference value. If NO is the answer, ordinary semiactive control based on the basic control logic is executed in the same way as at Step S4 in the first embodiment (Step S4).

If YES is the answer at Step S11, that is, if it is judged at Step S11 that the downward value (absolute acceleration) of the vertical acceleration sensor 6 exceeds the preset reference value, processing at Step S5 is executed. That is, at Step S5, the controller 21 executes the following control in place of the control based on the absolute velocity, which is executed at Step S4: The controller 21 sets the passage area control member in a region beyond the above predetermined region, and outputs $\theta_{max}$ as a control signal $\theta$ for the actuator 5 so that a relatively large value is obtained as a damping coefficient for the extension stroke, and a relatively small value is obtained as a damping coefficient for the retraction stroke.

With the suspension control system, arranged as described above, when the value (absolute acceleration) of the vertical acceleration sensor 6 exceeds the preset reference value during running of the vehicle because the wheel concerned falls into a depression, for example, as shown in FIG. 13, the damping coefficient for the extension stroke becomes relatively large. Accordingly, the suspension control system of this embodiment effectively functions without causing full bounce as occurs with the conventional suspension control system shown in FIG. 11 when the wheel falls into a depression. Thus, the ride quality can be improved.

Figure 10A:
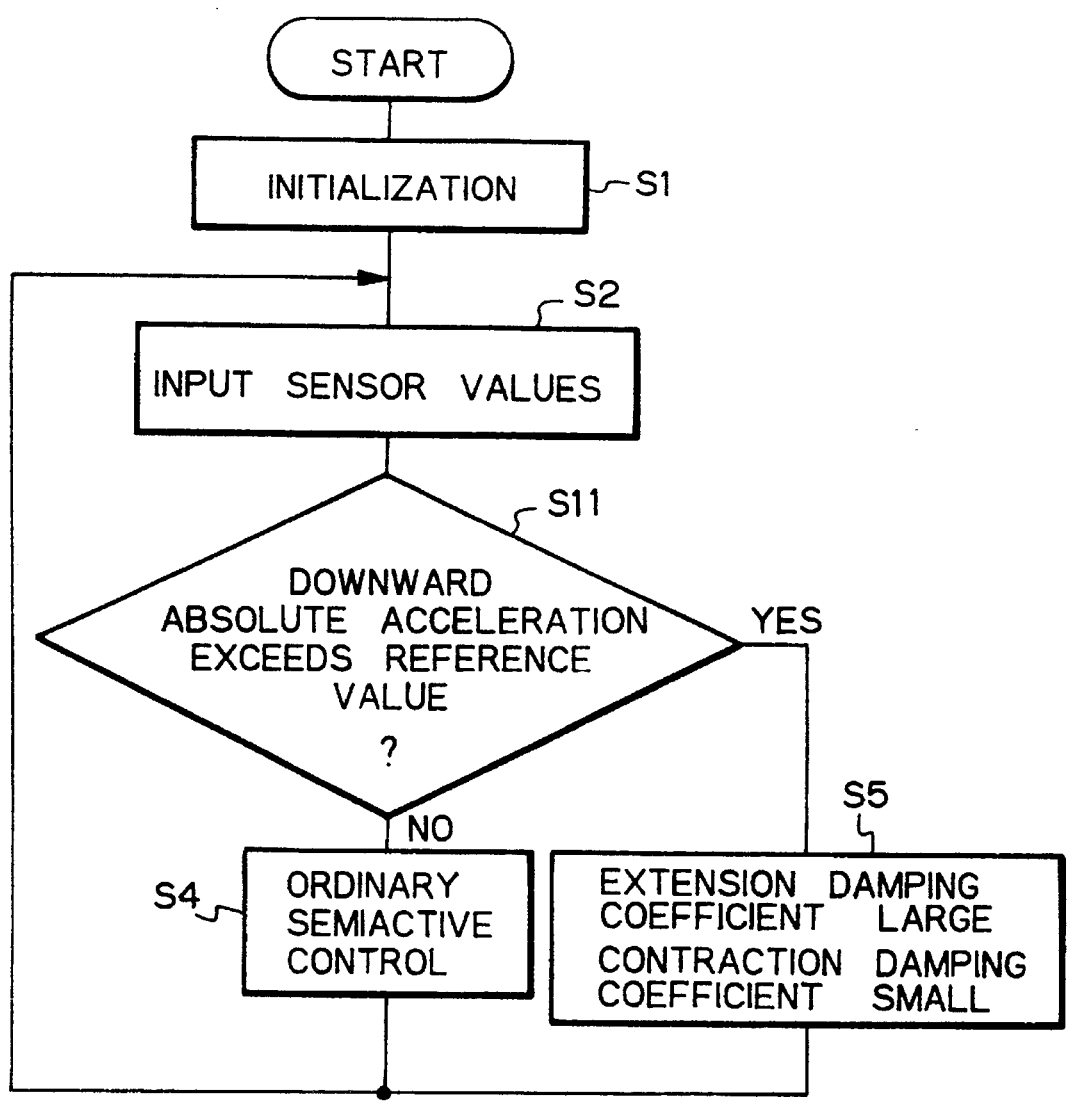
FIG. 10A is a flowchart showing the contents of control executed by a controller in the suspension control system of the second embodiment.
Figure 10B:
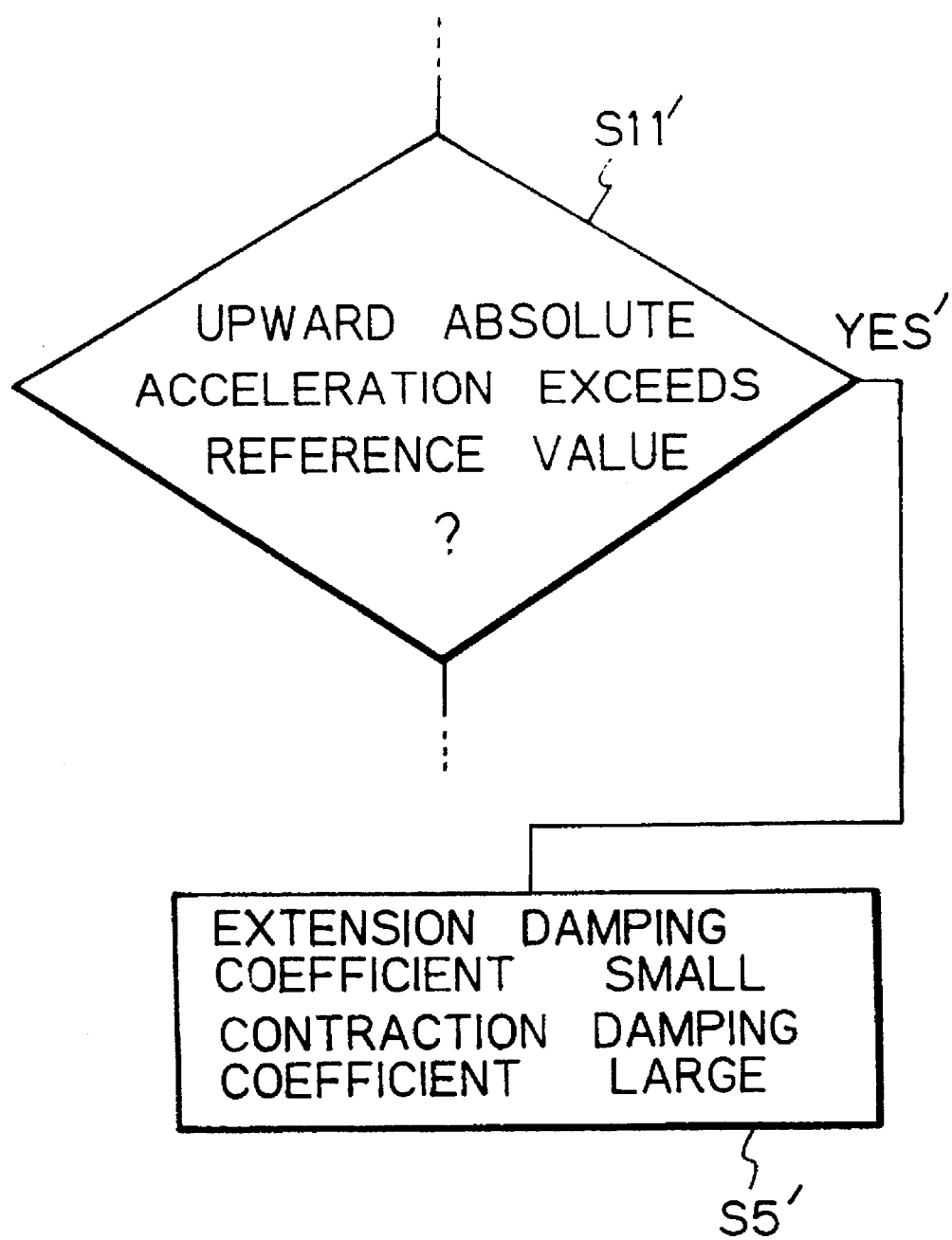
FIG. 10B is a flowchart showing a modification of the control process shown in FIG. 10A.

The second embodiment may be modified so as to prevent full bump, which might otherwise occur when the wheel concerned runs onto a relatively large projection at high speed, by changing Steps S11 and S5 in FIG. 10A into Steps S11' and S5' shown in FIG. 10B. More specifically, Step S11 in FIG. 10A is replaced by Step S11' where it is judged whether or not the magnitude of the upward absolute acceleration exceeds a preset reference value. If YES is the answer, the process proceeds to Step S5' in place of Step S5 in FIG. 10A, where $\theta_{min}$ is output as an actuator control signal $\theta$ so that the damping coefficient for the extension stroke is relatively small, while the damping coefficient for the retraction stroke is relatively large. Thus, with priority to the above-described control based on the absolute velocity, the passage area control member is set in the extension "soft" region, so that a relatively large value can be obtained as a damping coefficient for the retraction stroke when the piston rod is retracted, for example, when the wheel concerned runs onto a projection. Accordingly, the suspension control system of this modification effectively functions without causing so-called full bump as occurs with the conventional suspension control system of the same type when the shock absorber is contracted, for example, when the wheel runs onto a projection at high speed. Thus, the ride quality call be improved.

Although in the foregoing embodiment an example of preventing full bounce when the wheel falls into a depression and an example of preventing full bump when the wheel runs onto a projection have been explained independently of each other, it should be noted that the suspension control system may be arranged in conformity to the concept of each particular vehicle to which it is applied. That is, the suspension control system may be arranged to prevent either full bounce or full bump. Alternatively, the suspension control system may be arranged such that when the absolute acceleration exceeds a reference value, it is judged whether the direction of the absolute acceleration is downward or upward, and Step S5 or S5' is selected according to the direction of the absolute acceleration, thereby preventing both full bounce and full bump.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A suspension control system comprising: a hydraulic shock absorber provided between a vehicle body and a wheel and having an actuator which is driven so that a damping coefficient thereof during at least an extension stroke of said shock absorber can be varied; means for detecting an absolute velocity of said vehicle body in a vertical direction;

means for detecting a relative velocity between said vehicle body and said wheel; and actuator control means for increasing the damping coefficient of said shock absorber, for the extension stroke thereof, in accordance with the magnitude of the absolute velocity when the direction of the absolute velocity detected by said absolute velocity detecting means is upward, said actuator control means for setting the damping coefficient of said shock absorber to a relatively small value, for the extension stroke thereof, when the direction of the absolute velocity detected by said absolute velocity detecting means is downward, and said actuator control means for setting the damping coefficient of said shock absorber, for the extension stroke thereof, to a large value only when the magnitude of the relative velocity in the direction of the extension stroke detected by said relative velocity detecting means exceeds a preset reference value.

2. A suspension control system comprising: a hydraulic shock absorber provided between a vehicle body and a wheel and having an actuator which is driven so that a damping coefficient thereof during at least a retraction stroke of said shock absorber can be varied; means for detecting an absolute velocity of said vehicle body in a vertical direction;

means for detecting a relative velocity between said vehicle body and said wheel; and actuator control means for increasing the damping coefficient of said shock absorber, for the retraction stroke thereof, in accordance with the magnitude of the absolute velocity when the direction of the absolute velocity detected by said absolute velocity detecting means is downward, said actuator control means for setting the damping coefficient of said shock absorber, for the retraction stroke thereof, to a small value when the direction of the absolute velocity detected by said absolute velocity detecting means is upward, and said actuator control means for setting the damping coefficient of said shock absorber, for the retraction stroke thereof, to a relatively large value only when the magnitude of the relative velocity in the direction of the retraction stroke detected by said relative velocity detecting means exceeds a preset reference value.

3. A suspension control system comprising: a hydraulic shock absorber provided between a vehicle body and a wheel and having an actuator which is controllable so that a damping coefficient thereof during at least an extension stroke of said shock absorber can be varied; means for detecting an absolute velocity of said vehicle body in a vertical direction;

means for detecting vertical acceleration acting on said vehicle body; and actuator control means for increasing the damping coefficient of said shock absorber, for the extension stroke thereof, in accordance with the magnitude of the absolute velocity when the direction of the absolute velocity detected by said absolute velocity detecting means is upward, said actuator control means for setting the damping coefficient of said shock absorber to a relatively small value, for the extension stroke thereof, when the direction of the absolute velocity detected by said absolute velocity detecting means is downward, and said actuator control means for setting the damping coefficient of said shock absorber, for the extension stroke thereof, to a large value only when the magnitude of downward acceleration detected by said vertical acceleration detecting means exceeds a preset reference value.

4. A suspension control system comprising: a hydraulic shock absorber provided between a vehicle body and a wheel and having an actuator which is controllable so that a damping coefficient for at least a retraction stroke of said shock absorber can be varied; means for detecting an absolute velocity of said vehicle body in a vertical direction;

means for detecting vertical acceleration acting on said vehicle body; and actuator control means for increasing the damping coefficient of said shock absorber, for the retraction stroke thereof, in accordance with the magnitude of the absolute velocity when the direction of the absolute velocity detected by said absolute velocity detecting means is downward, said actuator control means for setting the damping coefficient of said shock absorber, for the retraction stroke thereof, to a small value when the direction of the absolute velocity detected by said absolute velocity detecting means is upward, and said actuator control means for setting the damping coefficient of said shock absorber, for the retraction stroke thereof, to a relatively large value only when the magnitude of upward acceleration detected by said vertical acceleration detecting means exceeds a preset reference value.

* * * * *